United States Patent
Matsueda

(10) Patent No.: US 6,985,243 B1
(45) Date of Patent: Jan. 10, 2006

(54) PRINT SERVER APPARATUS, INFORMATION PROCESSING APPARATUS AS CLIENT, PRINT MANAGING METHOD FOR THESE APPARATUSES, AND STORAGE MEDIUM

(75) Inventor: Kazutaka Matsueda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/512,358

(22) Filed: Feb. 24, 2000

(30) Foreign Application Priority Data

Feb. 25, 1999 (JP) ................................. 11-049122
Jan. 24, 2000 (JP) ............................. 2000-014843

(51) Int. Cl.
  *B41B 1/00* (2006.01)
  *G06K 15/00* (2006.01)

(52) U.S. Cl. .................... 358/1.15; 358/1.1; 358/1.16; 358/1.17

(58) Field of Classification Search ............... 358/1.13, 358/1.15, 1.16, 1.2, 1.11, 1.9, 1.14, 1.1
  See application file for complete search history.

(56) References Cited

U.S. PATENT DOCUMENTS

| | | | | |
|---|---|---|---|---|
| 5,617,518 A | * | 4/1997 | Kuwamoto et al. | 358/1.15 |
| 5,822,499 A | * | 10/1998 | Okada et al. | 358/1.1 |
| 6,181,436 B1 | * | 1/2001 | Kurachi | 358/1.15 |
| 6,226,097 B1 | * | 5/2001 | Kimura | 358/1.14 |
| 6,633,400 B1 | * | 10/2003 | Sasaki et al. | 358/1.15 |

OTHER PUBLICATIONS

U.S. Appl. No. 08/352,883, filed Dec. 9, 1994.

* cited by examiner

Primary Examiner—Gabriel Garcia
Assistant Examiner—Thierry L. Pham
(74) Attorney, Agent, or Firm—Fitzpatrick, Cella, Harper & Scinto

(57) ABSTRACT

A print server system where a user can select a spooler of a server or that of a client from which a stored image is to be print-outputted. Clients 12, 14 and 15 respectively have a first storage in which an image for which the client requested printing is stored. All the images for which printing have been requested from the clients are stored in a second storage in a server 16 which manages a printer 18. Upon actual print operation, a user designates one of the storages from which the stored image is to be transmitted to the printer, in accordance with a displayed screen image.

42 Claims, 13 Drawing Sheets

FIG. 6

PRINT SERVER SYSTEM MANAGER

| NAME | PRINT REQUEST TIME | CLIENT NAME | DOCUMENT GENERATION DATE | PRINT DATA |
|---|---|---|---|---|
| DOCUMENT 1.doc | 10:00 | NO.1 | 98.12.12 | FROM CLIENT |
| TABLE 1.doc | 10:02 | NO.2 | 98.12.12 | FROM CLIENT |
| GRAPH 1.txt | 10:03 | NO.3 | 98.12.11 | FROM SERVER |

FIG. 7

PRINT SERVER SYSTEM PRINT LOG

| NAME | PRINT COMPLETION TIME | CLIENT NAME | DOCUMENT GENERATION DATE | PRINT DATA |
|---|---|---|---|---|
| DOCUMENT 1.doc | 10:05 | NO.1 | 98.12.12 | FROM CLIENT |
| TABLE 1.doc | 10:07 | NO.2 | 98.12.12 | FROM CLIENT |
| GRAPH 1.txt | 10:08 | NO.3 | 98.12.11 | FROM SERVER |

FIG. 11

PRINT SERVER SYSTEM MANAGER

DESIGNATE JOB TO BE PREVIEWED

| NAME | PRINT REQUEST TIME | CLIENT NAME | DOCUMENT GENERATION DATE |
|---|---|---|---|
| DOCUMENT 1.doc | 10:00 | NO.1 | 98.12.12 |
| TABLE 1.doc | 10:02 | NO.2 | 98.12.12 |
| GRAPH 1.txt | 10:03 | NO.3 | 98.12.11 |

OK ~ 1101    CANCEL

PRINT SERVER APPARATUS, INFORMATION PROCESSING APPARATUS AS CLIENT, PRINT MANAGING METHOD FOR THESE APPARATUSES, AND STORAGE MEDIUM

FIELD OF THE INVENTION

The present invention relates to a print server apparatus, an information processing apparatus as a client, a print managing method for these apparatuses and a storage medium, and more particularly, to print job management in a print server system having a server apparatus which monitors print jobs executed by a printer and a clients which request printing.

BACKGROUND OF THE INVENTION

In conventional print systems, a print job, to be executed by a print request from a client, is stored into a print server. The print server manages the order of print jobs, and monitors a printer as an output destination. If print-output is possible in the printer, the print server outputs the print jobs in print order to the printer, and clears the print jobs.

Further, in recent print systems, to reduce load on a network and a print server, a client transmits only a print request for execution of print job to the print server. The actual print job is stored in the client. When the print server receives the print request, it manages the order of print jobs, and if it is determined that print-output is possible in the printer, the print server sends a print permission to the client. The client directly outputs the print job to the printer and clears the print job.

In this manner, generally, one of a server that manages the order of print jobs and a client that issues a print request holds (spools) a print image as the actual object of print job. In a case where the server holds the print image, (in case of server spool), even when the client is down, the print job is ensured, and the printer status can be intensively managed. On the other hand, in a case where the client holds the print image (in case of client spool), as the print image is transmitted only from the client to the printer, the frequency of occurrence of LAN busy status is low.

In the above system, the object to be spooled in the server or client is a print image of the print job, i.e., only print data actually outputted to the printer. Further, when the print data has been outputted to the printer, the spool data in the server or client is deleted (cleared), and reuse of the data or the like is not considered.

Further, the client can obtain a list of print jobs spooled in the server and display job information (document names, owners names, print request times), however, as the job information of the print jobs spooled in the server include a small amount of information, it is impossible to know actual print-outputs to be obtained from the print jobs.

As described above, in the system where one of the server and the client has an image spooler has the following problems.

In a system where a server holds print data (print image), the print-data transmission routes are (I) client-server and (II) server-printer, i.e., the data is transmitted always via the server. This increases load on the LAN and easily causes a busy status. Further, as the server spools print data from a plurality of clients, it requires a large capacity memory. This increases load on the server and costs.

On the other hand, in a system where a client holds print data, the client cannot refer to a print job to be executed by a print request from another client. Otherwise, even if the client can obtain a list of print jobs to be executed by print requests from the clients to the server, the client can not obtain actual print-outputs of jobs regarding which the client did not issue print requests, only from the document names and the like. Further, when a client spooling a print job is down, the print job is not ensured.

SUMMARY OF THE INVENTION

Accordingly, it is a first object of the present invention to provide a print server system where a server and a client both have an image spooler, and the server automatically determines one of the spoolers to print-output an image stored there.

Further, it is a second object of the present invention to provide a print server system where a server and a client both have an image spooler, and a user selects one of the spool functions to be used to spool print data.

Further, it is a third object of the present invention to provide a print server system, where a server and a client both have an image spooler, automatically selects one of the spool functions to be used to spool print data.

Further, it is a fourth object of the present invention to provide a print server system where a client displays previews of print jobs spooled in a server or the client.

According to the present invention, the foregoing first object is attained by providing a server apparatus capable of communicating with at least one client and a printer via a network, comprising: image storage means for storing print data of a print job to be executed by a print request from the client; order management means for managing a print order of the print job to be executed by the print request from the client; and control means for transmitting print data of the print job in the print order from the image storage means to the printer if the print data is not transmitted from the client to the printer.

Further, according to one aspect of the present invention, the foregoing second object is attained by providing an information processing apparatus as a client capable of communicating with a server apparatus which manages a print order and a printer via a network, comprising: image storage means for storing print data of a print job to be executed by a print request; selection means for causing a user to select a spool function of the image storage means or that of the server apparatus for storing print data of a print job to be executed by a print request to the server apparatus; and control means for, if it is determined by using the selection means to use the spool function of the server apparatus, transmitting the print data to the server apparatus, while if it is determined by using the selection means to use the spool function of the image storage means, controlling the image storage means to store the print data.

Further, according to another aspect of the present invention, the foregoing third object is attained by providing an information processing apparatus as a client capable of communicating a server apparatus which manages a print order and a printer via a network, comprising: image storage means for storing print data of a print job to be executed by a print request; determination means for determining one of a spool function of the image storage means and that of the server apparatus for storing print data of a print job to be executed by a print request to the server apparatus; and control means for, if the determination means determines to use the spool function of the server apparatus, transmitting the print data to the server apparatus, while the determination means determines to use the spool function of the image storage means, controlling the image storage means to store the print data.

Further, according to another aspect of the present invention, the foregoing fourth object is attained by providing an information processing apparatus as a client capable of communicating with a server apparatus which manages a print order and a printer via a network, comprising: image storage means for storing image data of a print job to be executed by a print request; list acquisition means for acquiring a list of print jobs managed by the server apparatus; job designation means for designating a print job to be previewed based on the list of print jobs acquired by the acquisition means; image acquisition means for, if image data of the print job designated by the designation means is stored in the image storage means, reading the image data from the image storage means, while if the image data is stored in the server apparatus, downloading the image data from the server apparatus; and control means for displaying a preview image based on the image data acquired by the image acquisition means.

The above objects of the present invention are attained by providing a print managing method corresponding to the above server apparatus and the information processing apparatus as a client, and a storage medium holding a program to realize the print managing method.

According to the server apparatus or the information processing apparatus as a client in the print server system of the present invention, a print image is transmitted from one of image storage means, in accordance with network construction or operating status, by the user's designation or the client's automatic determination based on predetermined conditions. Thus an efficient and flexible system can be provided.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is an example of screen image showing jobs managed by the server;

FIG. 7 is an example of print logs showing the histories of the jobs respectively at the completion of execution;

FIG. 11 is an example of screen image showing print jobs managed by the server;

DETAILED DESCRIPTION OF THE PREFERRED EMBODIMENTS

Preferred embodiments of the present invention will now be described in detail in accordance with the accompanying drawings.

Figure 1:
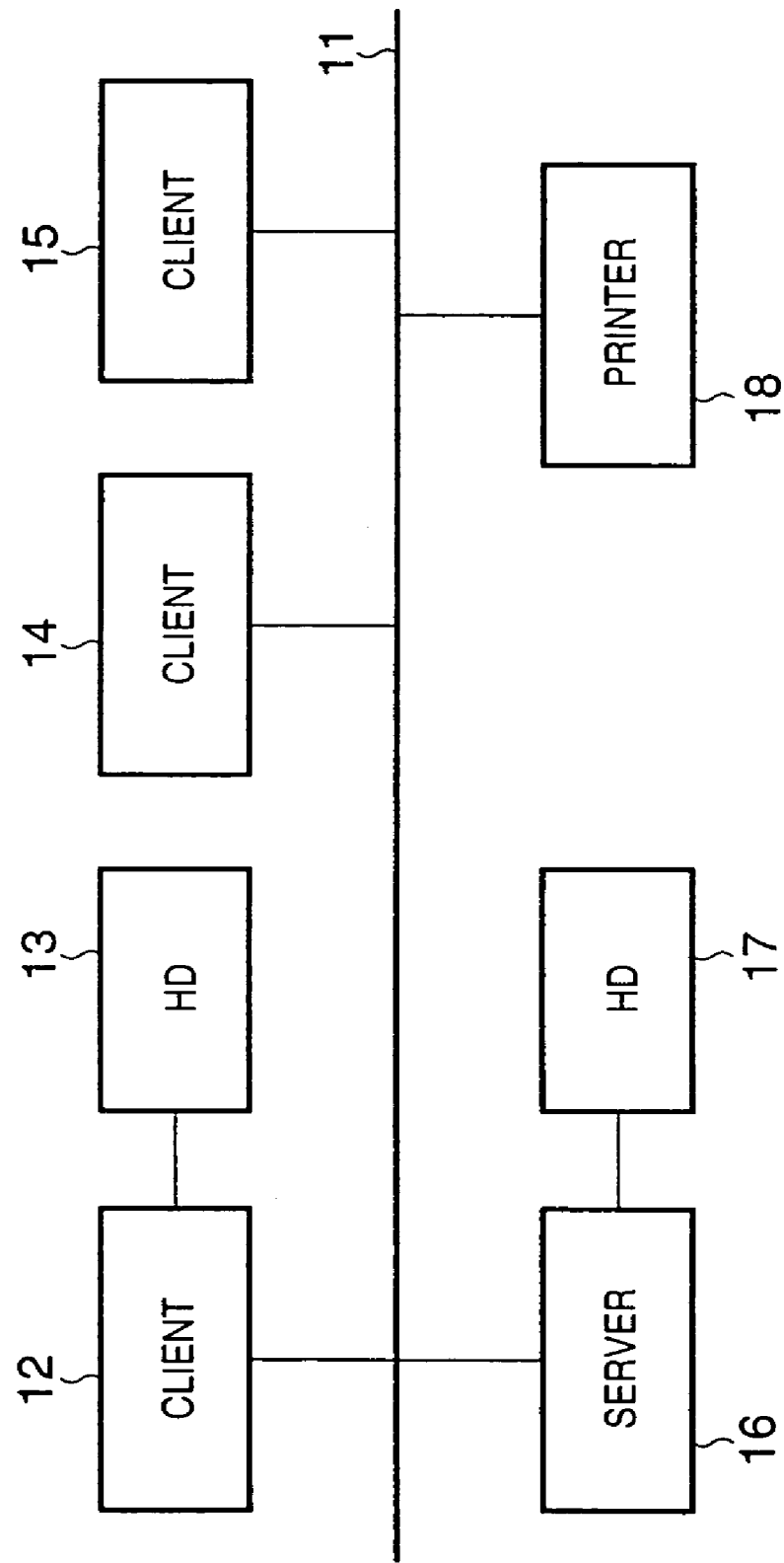
FIG. 1 is a block diagram showing the construction of a print server system of the present invention.

FIG. 1 is a block diagram showing the construction of a print server system according to a first embodiment of the present invention. In FIG. 1, reference numeral 11 denotes a LAN (Local Area Network) connectable to a personal computer, a work station, a printer and the like in accordance with TCP/IP protocol or the like; 12, a client terminal such as a personal computer or a work station which issues a print request; 13, a memory device such as a hard disk attached to the client terminal; and 14 and 15, client terminals similar to the client terminal 12. The client terminals 14 and 15 do not necessarily have a memory device such as a hard disk.

Numeral 16 denotes a server apparatus having means for storing issuance of print-output requests, when issued from the client terminals 12, 14 and 15; 17, a memory device such as a hard disk, attached to the server 16; and 18, a printer which print-outputs images in accordance with output requests from the client terminals 12, 14 and 15.

Figure 2:
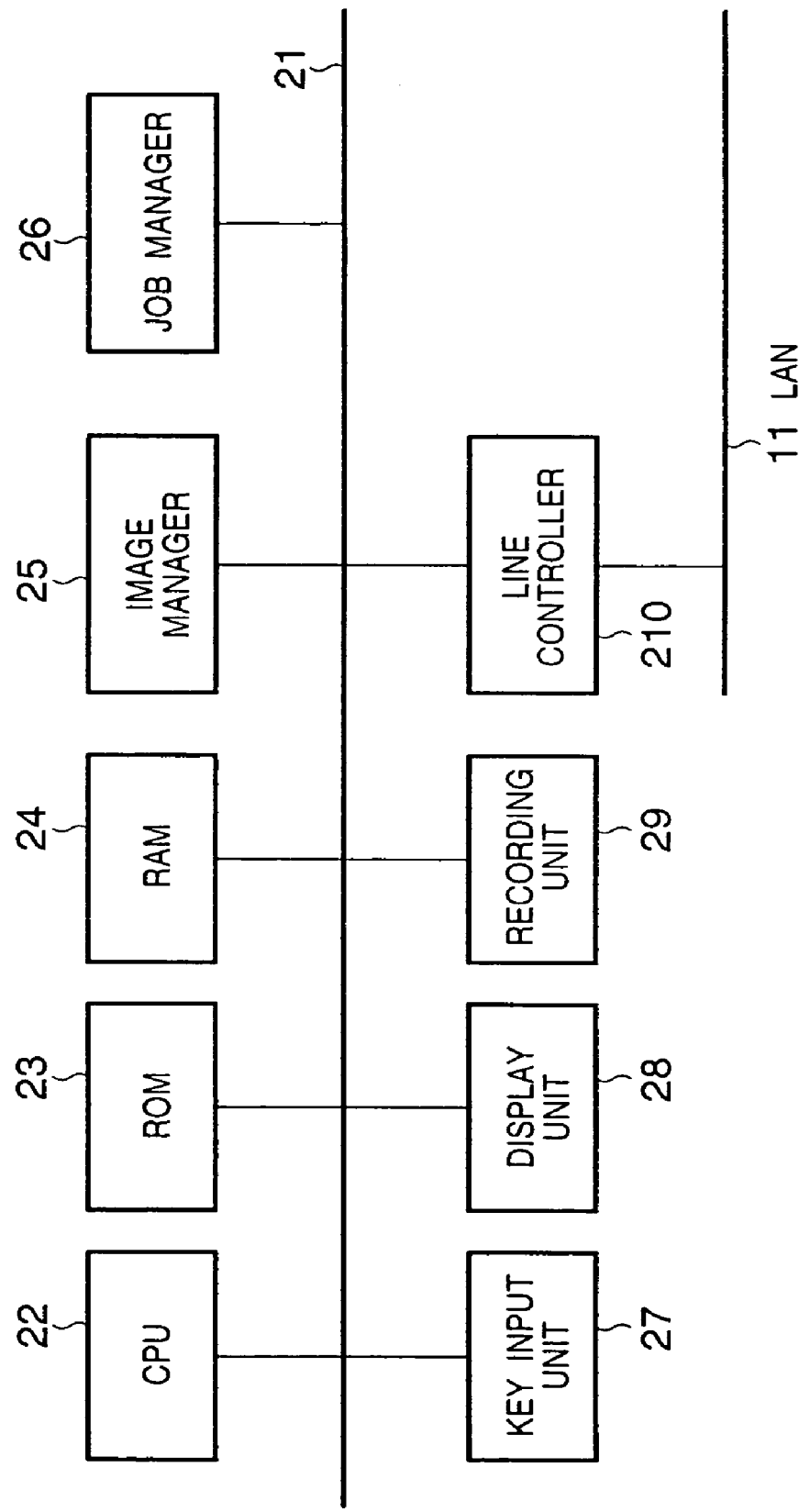
FIG. 2 is a block diagram showing the construction of a server and a client in FIG. 1.

FIG. 2 is a block diagram showing the construction of the client terminals 12, 14 and 15 and the server 16. Numeral 21 denotes a system bus connecting the respective elements; 22, a CPU which controls the system based on various programs stored in a ROM or other storages; 23, a ROM in which control code (including a printer driver and a print control program) executed by the CPU 22 is stored; and 24, a RAM used as a work area for the CPU 22 or the like.

Numeral 25 denotes an image manager. In the client terminal, upon issuance of output request to the server, an EMF file (intermediate file) obtained from an OS and print data generated by the printer driver are stored. In the server, when a server spooler is used, output request images (print data and EMF files) from the respective clients are stored. The image manager 25 serves as a spooler to hold print images. In this manner, the clients and the server respectively have the image manager in the present embodiment.

Numeral 26 denotes a job manager. In the client, the job manager 26 stores information which is periodically updated from the server. In the server, the job manager 26 adds job information to stored job information in accordance with print requests from the respective clients, manages the print order, and manages information deleted after print-output by the printer is managed. Further, the job manager 26 manages statuses of plural printers via the LAN 11, and if the job manager determines that print output is possible by the printer, it transmits print data of a print job spooled in the image manager to the printer, or generates transmission permission information indicative of permission to a client, which required execution of the print job in the print order, to transmit print data to the printer.

Numeral 27 denotes a key input unit for the user to perform key operation; 28, a display unit such as a CRT which displays various information such as the contents of the job management; 29, a recorder which performs recording on a recording medium; and 210, a line controller which performs communication with the server, the clients and the printer, and controls the protocol for the LAN.

Figure 3:
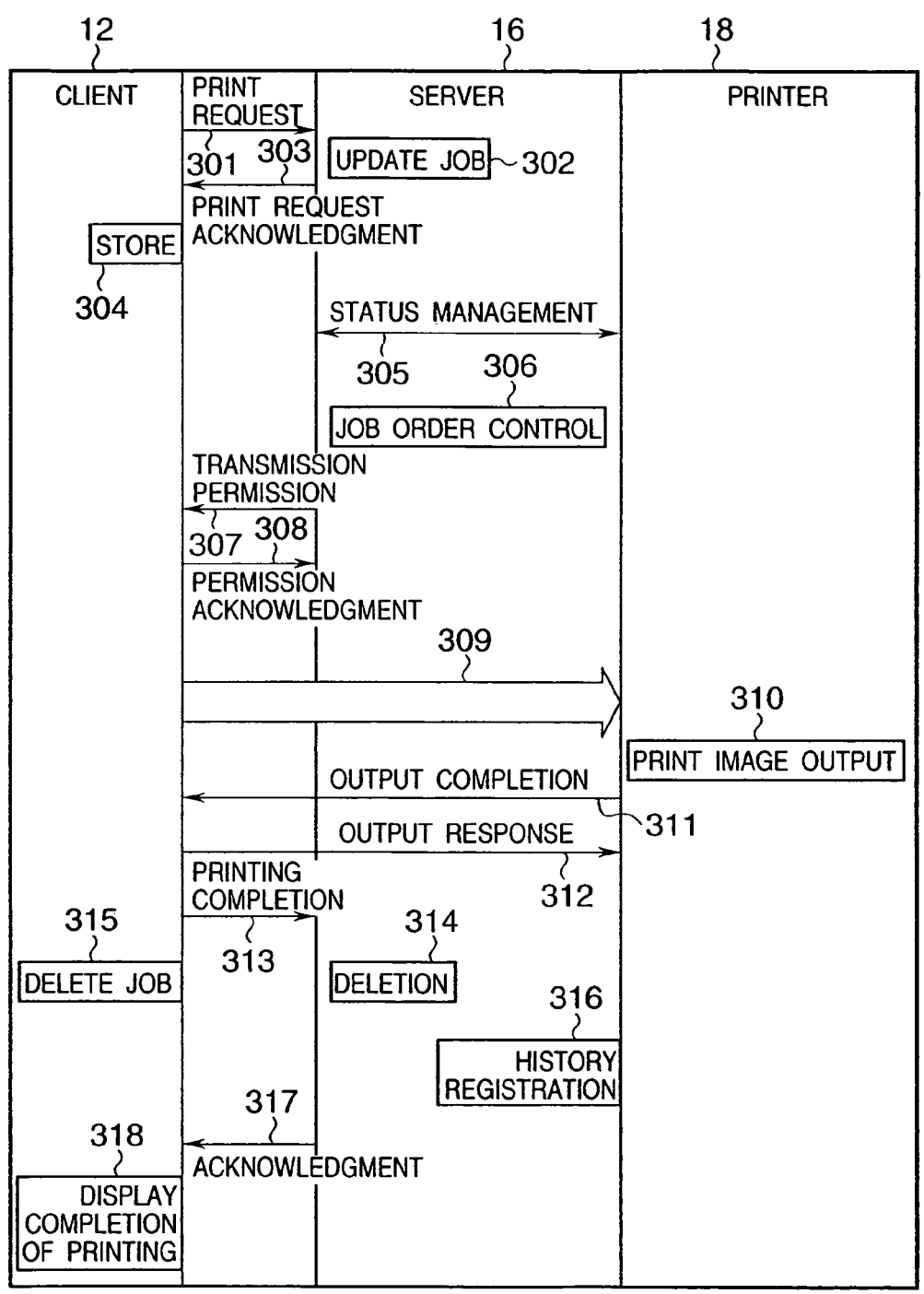
FIG. 3 shows a sequence in the server when image printing is required from the client.

FIG. 3 shows a sequence in the print server system when image printing is required from the client. In FIG. 3, processing is sequentially performed in order of reference numeral among the client, in an top-to-bottom direction in the figure, the client 12, the server 16 and the printer 18. In this figure, an arrow represents information transmission, and a box, processing by each device.

First, printing is selected by the operator's designation, and the following sequence processing is performed. Upon selection of printing by the operator's designation, the application outputs a GDI (Graphical Device Interface) function as drawing data to drawing means of the OS. In Windows OS (a trade mark of Microsoft Corporation), the drawing means of the OS corresponds to Win32API. The drawing means of the OS generates a DDI (Device Driver Interface) function based on the GDI function received from the application, and outputs the generated function as an EMF file. The printer driver converts the DDI function into print data and spools the print data in a print spooler. When all the print data has been generated, the print data is outputted, in case of server spooler, to the server, while in case of client spooler, to the image manager 25.

When the print data has been generated, the client 12 transmits a print request to the server 16 (301). The print request information is job information including the document name, the owner name, the output printer port number and the like of the print job. The print request information does not include print data to be actually used for drawing. The server 16 adds the print request to job information which the server 16 manages, updates the print order (302), and sends an acknowledgment message (print request acknowledgment) to the client 12 (303).

Although it will be described in detail later, the print request information from the client 12 and the job information managed by the server 16 include data indicating whether image information is to be transmitted from the client 12 or from the server 16, to the printer 18. In this example, print image data is transmitted from the client 12 to the printer 18.

Next, the client 12 stores the print data generated by the printer driver and the intermediate data (EMF file) obtained from the OS into the image manager 25 serving as a virtual spooler in the client (304).

The server 16 manages the status of the printer 18 as an output destination (305). The server 16 organizes print requests from the respective clients, and controls execution of jobs in a predetermined order while it is determined that the job is in print-output enabled status in the printer.

When the client 12 that transmitted the print request information is in its turn to perform printing, the server 16 transmits transmission permission information (307), indicative of permission of transmission of print data to the printer, to the client 12. Then the client 12 returns permission acknowledgment information (308), which is an acknowledgment response to the transmission permission information, to the server 16, and transmits the print data to the printer (309).

The printer 18 receives the print data and outputs a print image (310). When all the transmitted print data has been print-outputted, an output completion message (311) indicating completion of output is transmitted from a network board of the printer 18 to the client 12 as the print data transmitter. In response to the received message, the client 12 returns an acknowledgment response message (312) to the printer 18.

In this example, the printer 18 transmits the output completion message to the client 12 and the client 12 is informed of the completion of print operation by the printer 18 by the reception of the message, however, it may be arranged such that the client 12 transmits the print image (309) and then the client always monitors the status of the printer 18 by polling the printer so as to be informed of the completion of the print operation. In this case, the message 311 from the printer 18 and the response message 312 to the message 311 can be omitted.

Then, the client 12 sends a print completion message (313) indicative of the completion of printing to the server 16, and the server 16 receives the message and deletes the managed job information (314). Further, the client 12 deletes the print data managed in the image manager 25 (315). At this point, the server 16 registers the print history of the job (316). The print data and the job information may not be deleted at this timing but may be held for a predetermined period, while the printer status is set to an output completion status.

The server 16 transmits a print completion acknowledgment message (317) to the client 12, and the client 12 receives the message and displays a print completion notification (318) for the user.

The above sequence corresponds to processing in case of client spool. In case of server spool, the storage of the print data and the EMF file (304) is performed by the server 16. In this case, when the client 12 receives the print request acknowledgment from the server 16, the client 12 transmits the print data and the EMF file to the server 16. The server 16 stores the print data and the EMF file received from the client 12, in correspondence with the job information, into the image manager 25. The transmission permission (307) and the transmission permission acknowledgment (308) are not transmitted. The server 16 transmits the print data to the printer 18 (309). The network board of the printer 18 sends the output completion message (311) to the server 16 as the print data transmitter, and the server 16 sends the acknowledgment response message (312) to the printer 18. Then the server 16 sends the print completion message (313) notifying the completion of printing to the client 12. At the same time of the deletion of job information (314), the deletion of print data (315) is performed by the server.

Figure 4:
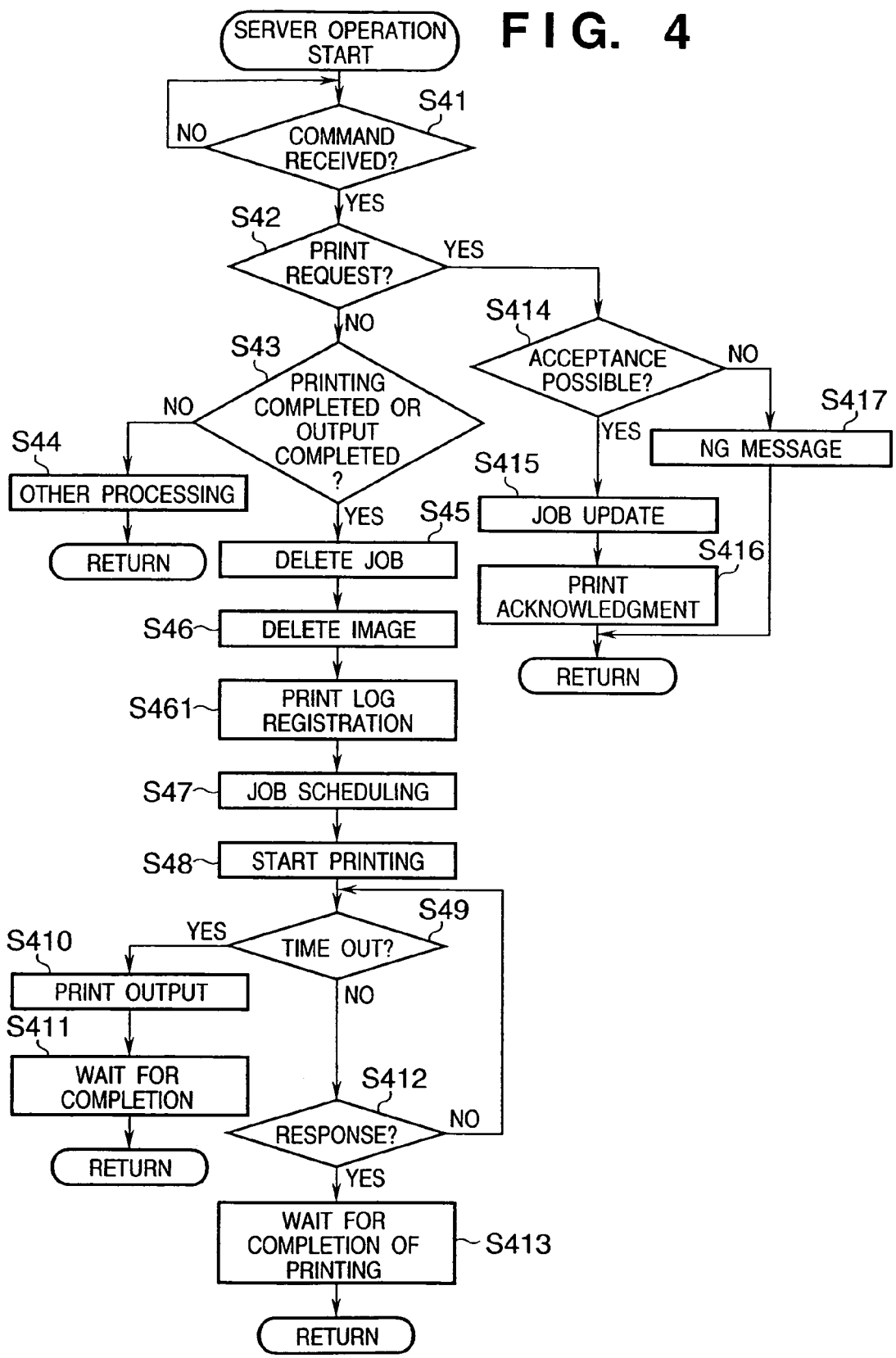
FIG. 4 is a flowchart showing the processing by the server corresponding to the sequence in FIG. 3.

FIG. 4 is a flowchart showing the processing by the server 16 in case of client spool or server spool, corresponding to the sequence in FIG. 3 and the later description. In this flowchart, "Return" means that processing returns to step S41.

The server 16 starts operation, then process proceeds to step S41, at which the server 16 waits for a command from the respective clients or the printer 18. When a command is received, the process proceeds to step S42, at which the server 16 determines whether or not the received command is print request information.

If the received command is not print request information, the process proceeds to step S43, while if it is determined that the received command is a print completion message (in case of client spool) from the client or the output completion message (in case of server spool) from the printer, the process proceeds to step S45. The output completion message from the printer is a message indicative of the result of print output at step S410 performed prior to this processing. At step S45, the server 16 deletes the output-completed job information. In case of server spool, the print data and the EMF file are deleted at step S46. At step S461, the server 16 registers the history of the print-completed print job as a log.

The data indicative of a terminal which sent the print image to the printer 18 is also stored into the log data and registered.

At step S47, the server 16 performs job scheduling to determine a print job for the next printing by the printer. When a job has been determined, the server 16 transmits transmission permission information indicating that transmission of print data to the printer is possible, to the client that registered the job, at step S48 in case of client spool. At step S49, the server 16 monitors time-out by the reception of response to the transmission permission information sent at step S48.

In case of server spool at step S48, or if the response to the transmission permission information has not been received within a predetermined period at step S49, the process proceeds to step S410, at which it is determined that the client that transmitted the print request is down. Then the print data held in the image manager 25 as a spooling area of the server is directly transmitted to the print data. When the transmission has been completed, the completion of print output is waited at step S411.

On the other hand, if the permission acknowledgment information as a response message to the transmission permission information is received without time-out at step S49, the process proceeds to step S412 to receive a printing completion command from the client.

Further, if it is determined that the command received at step S42 is the print request command, the process proceeds to step S414, at which the server 16 determines whether or not print data can be accepted (spooled). If print data can be accepted, the process proceeds to step S415, at which the job is newly held. As processing of the storage of new job, the server 16 receives the print data and the EMF file from the client and stores them into the image manager 25, and causes the job manager to manage the job information. Then the server 16 returns a print request acknowledgment to the client that transmitted the print request command.

If it is determined at step S414 that the capacity of the image manager 24 is full and the print data and the EMF file cannot be spooled, the process proceeds to step S417, at which an NG message indicating that the print data cannot be spooled is transmitted to the client that sent the print request information. Note that as this does not interfere with the management of print order by job information or the like, the client continues printing by performing client spooling processing. Accordingly, at step S417, the server 16 manages the print order by using the job manager 26 in accordance with the print request information from the client.

As described above, in the present embodiment, the server 16 and the clients respectively have the image manager 25 serving as a spooler. As described about the processing at steps S49 to S411, even if a client which transmitted print request information is down, the server 16 directly transmits a print image to the printer 18 to perform printing, and normally checks the completion of print operation.

On the contrary, if the server is down or the image manager 25 of the server is in memory-full status, the client can output a print image from its own spooler.

In the above description, print data is spooled in the image manager 25 of the client and the image manager 25 of the server, and the print data is transmitted to the printer alternately from the managers in accordance with circumstance, in a complementary manner. Next, print processing upon designation of spooler by the user will be described.

Figure 5:
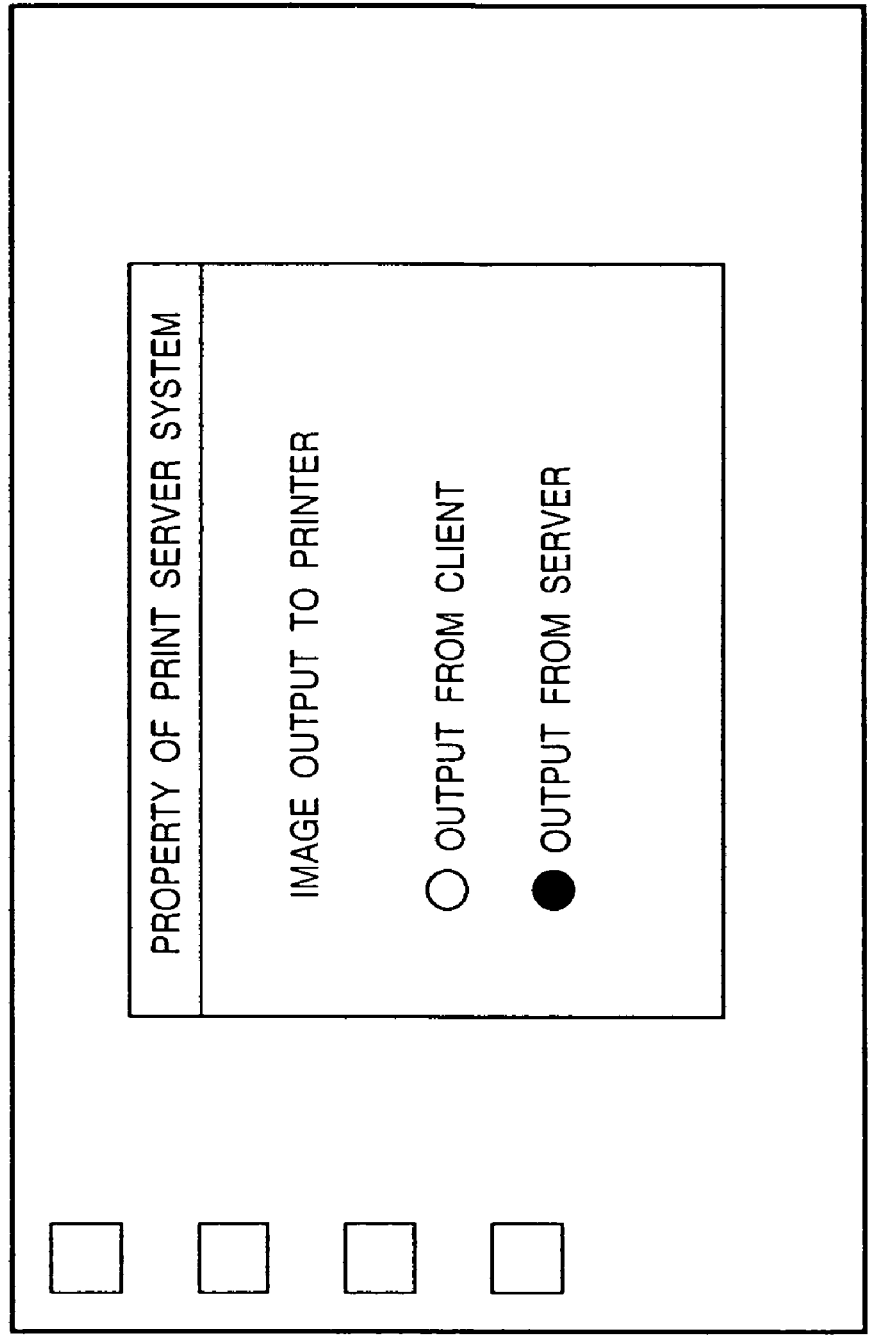
FIG. 5 is an example of screen image for selecting the client or the server to send a print image to the printer.

FIG. 5 is an example of screen image for the user to select the client or the server as a transmitting device to send a print image to the printer. This screen image is a printer registration image in the OS used upon printer port setting.

This figure shows print data to be transmitted to the printer, spooled in the server. In this manner, the user can designate the client or the server to transmit a print image to the printer, in correspondence with operating status or purpose.

In this manner, upon printer port registration in the printer driver, a spool function can be selected for print data output to the printer. Thereafter, the client and the server can determine a spool function having priority by determination of the selected port of the output destination.

Further, the user selection as shown in FIG. 5 may be set for each job by opening a property image of the printer driver upon print designation.

FIG. 6 is an example of screen image displayed on the display unit of the client when the client obtains a list of jobs managed by the job manager 26 of the server 16. In this case, registered jobs are presented on a CRT screen or the like. In this figure, three documents are stacked in a printer queue. The displayed information includes document names, print request times, client names, document generation dates and print data. The print data indicative of server/client as a transmitter to transmit a print image to the printer. For example, "Document 1.doc" indicates that the client transmits the print image to the printer. In this figure, the Document 1 is selected by a pointing device such as a mouse, and various information corresponding to the selected job are emphasized by italicized letters.

FIG. 7 is an example of print logs showing the histories of the jobs in FIG. 6 respectively at the completion of execution. The log may be displayed as shown in FIG. 7 on the CRT, or may be outputted onto a print medium. The display items in this figure are the same as those in FIG. 6.

As the user interface screen image in FIGS. 6 and 7, a job list and print logs are obtained from the server 16 by utility software of the client 12 used in the present print control system, and displayed on the CRT of the client 12. The utility software is stored as a program in the ROM (or an external memory (not shown)) of the respective clients. The above processing is realized by reading the program onto the RAM 24 and executing the program by the CPU 22.

The object of the present invention can be also achieved by providing a storage medium (or recording medium) storing program code of software for realizing the functions of the present embodiment to a system or an apparatus, reading the program code with a computer (e.g., CPU, MPU) of the system or apparatus from the storage medium, then executing the program.

In this case, the program code read from the storage medium itself realizes the functions of the embodiment, and the storage medium storing the program code constitutes the invention. Furthermore, besides aforesaid functions according to the above embodiment is realized by executing the program code which is read by a computer, the present invention includes a case where an OS (operating system) or the like working on the computer performs a part or entire processes in accordance with designations of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, a CPU or the like contained in the function expansion card or unit performs a part or entire process in accordance with designations of the program code and realizes functions of the above embodiment.

Figure 8:
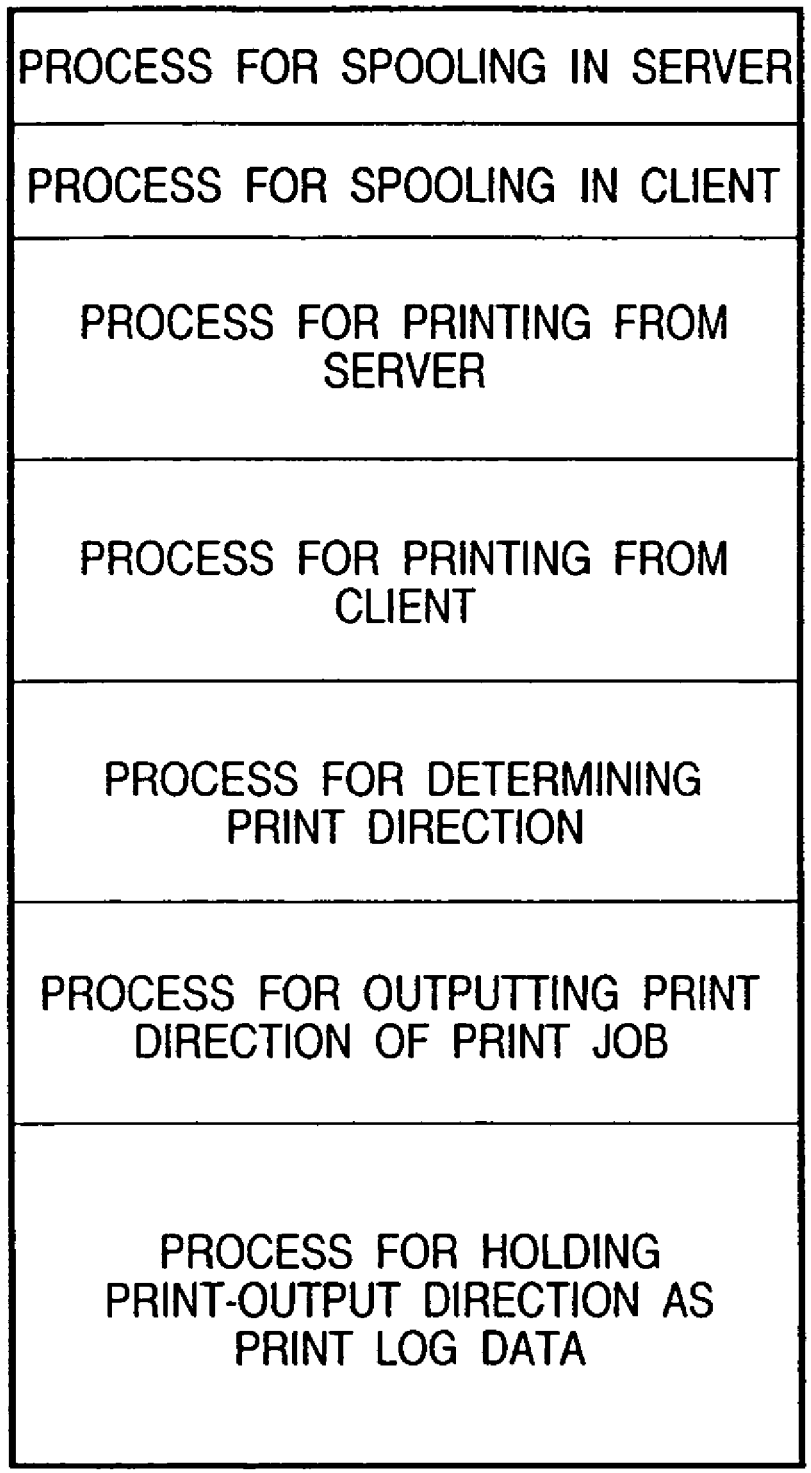
FIG. 8 is a table showing processes stored in a storage medium to realize a first embodiment of the present invention.

FIG. 8 is a table showing processes stored in a storage medium to realize the functions of the present embodiment. In this case, the storage medium contains processes necessary for both server and client, and only necessary processes are executed in correspondence with the server or client to operate.

In the server 16, in addition to these processes, program code corresponding to the above-described flowchart (in FIG. 4) is stored.

As described above, according to the print server system of the first embodiment, the following advantages can be obtained.
(1) In a system where a server and a client both have a spooler, a user can easily select one of the server and the client to transmit print data to a printer, in consideration of purpose, operating status and the like, as a more efficient print-data transmitter.
(2) The information indicating a spooler which transmits print data to the printer can be externally displayed on a CRT or the like.
(3) As a print log of printing by the printer can be stored, a more efficient system can be constructed by analyzing printer operating status or purpose.

As described above, the first embodiment of the present invention uses spool functions of both client and server, and causes the user to designate a spooler to transmit print data to the printer. Only when the designated spooler is down or in another abnormal status, the print data is transmitted from another device. Thus printing can be ensured.

Next, the print server system according to a second embodiment of the present invention will be described with reference to the drawings.

The print server system of the second embodiment has a purpose of selectively using one of the spool functions of the server and the client.

The construction of the print server system of the present embodiment is the same as that shown in FIGS. 1 and 2, and the basic operation is approximately the same as that shown in FIGS. 3 and 4. Only the difference from FIG. 4 will be described.

When the server 16 receives the print request information from the client at step S42, it checks the port information of the output destination of the print request information or spool designation information. If there is spool designation information, the server 16 checks whether the spool designation information indicates the client or the server. If the spool designation information indicates client spool, the process proceeds to step S415. If the spool designation information indicates server spool, the print data and the EMF file are received from the client, and the process proceeds to step S415.

Further, if there is no spool designation information, the port of output destination is checked, and the port information pre-set in the server is checked. If the port information corresponding to the port of the output destination designated from the client designates client spool, as data to be used in actual drawing such as print data is spooled in the image manager of the client, only the job information included in the print request information is received from the client, and the process proceeds to step S415. If the port information corresponding to the port of the output destination designated from the client designates server spool, as data to be used in actual drawing such as print data is spooled in the image manager of the server, the print data and the EMF file are received from the client, and the process proceeds to step S415.

Further, in case of server spool, the print data is transmitted from the server to the printer at step S48, so as to perform print output by the printer. The processing such as time-out monitoring in the client is not performed.

Next, an example of selective use of spool functions of the server and the client will be described in the present embodiment.

Figure 9:
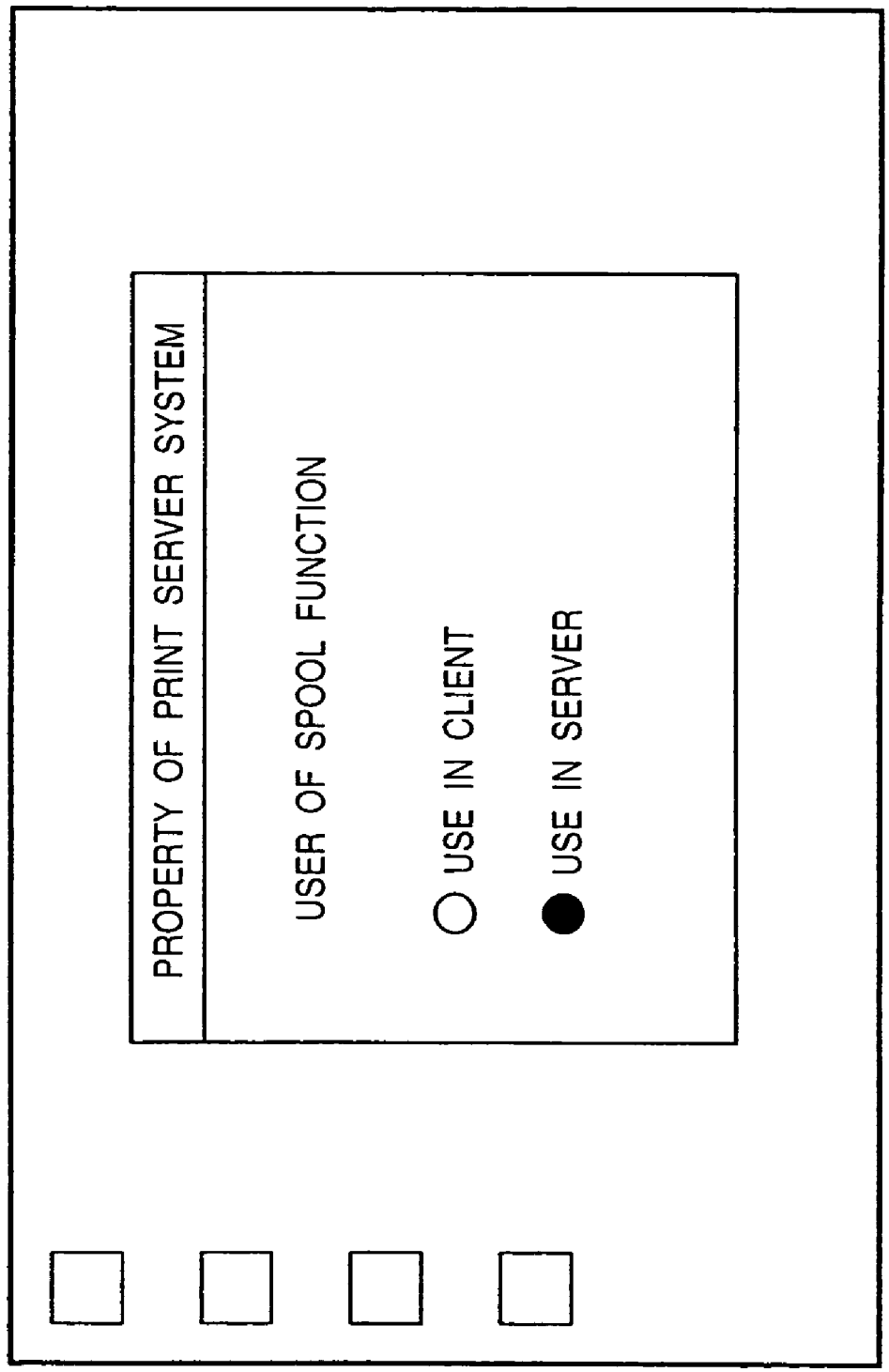
FIG. 9 is an example of screen image for a user's designation of one of spool functions.

First, a case where the use of one of the spools is designated by the user's selection will be described. In this case, a screen image as shown in FIG. 9 is displayed on the CRT and the user selects one of the spool functions. In FIG. 9, only the spool function of the server is used. This screen image is a printer registration image in the OS used upon printer port setting. The contents set upon printer registration are transmitted to the server 16 at the same time, and registered as printer port information into the RAM of the server.

Further, as the user interface screen image for selection of spool function as shown in FIG. 9, the property image of the printer driver upon printing designation may be used by the user to perform selection for each job.

As described above, the construction where spooling is performed in one of the client and the server has advantages and disadvantages. However, as the user can select a spool function, in a case where printing assurance is a high priority, the spool function of the server is used; in a case where LAN busy status removal is a high priority, the spool function of the client is used. In this manner, the system can be constructed in correspondence with operating status or user's purpose.

As described above, according to the second embodiment of the present invention, the user can designate one of the spool functions of the client and the server, and print processing is performed by using only the designated spool function.

Next, the print server system according to a third embodiment of the present invention will be described with reference to the drawings.

As in the case of the second embodiment, in the print server system of the third embodiment, one of the spools of the server and the client is used. However, in this embodiment, the client automatically determines which spool function is to be used.

Figure 10:
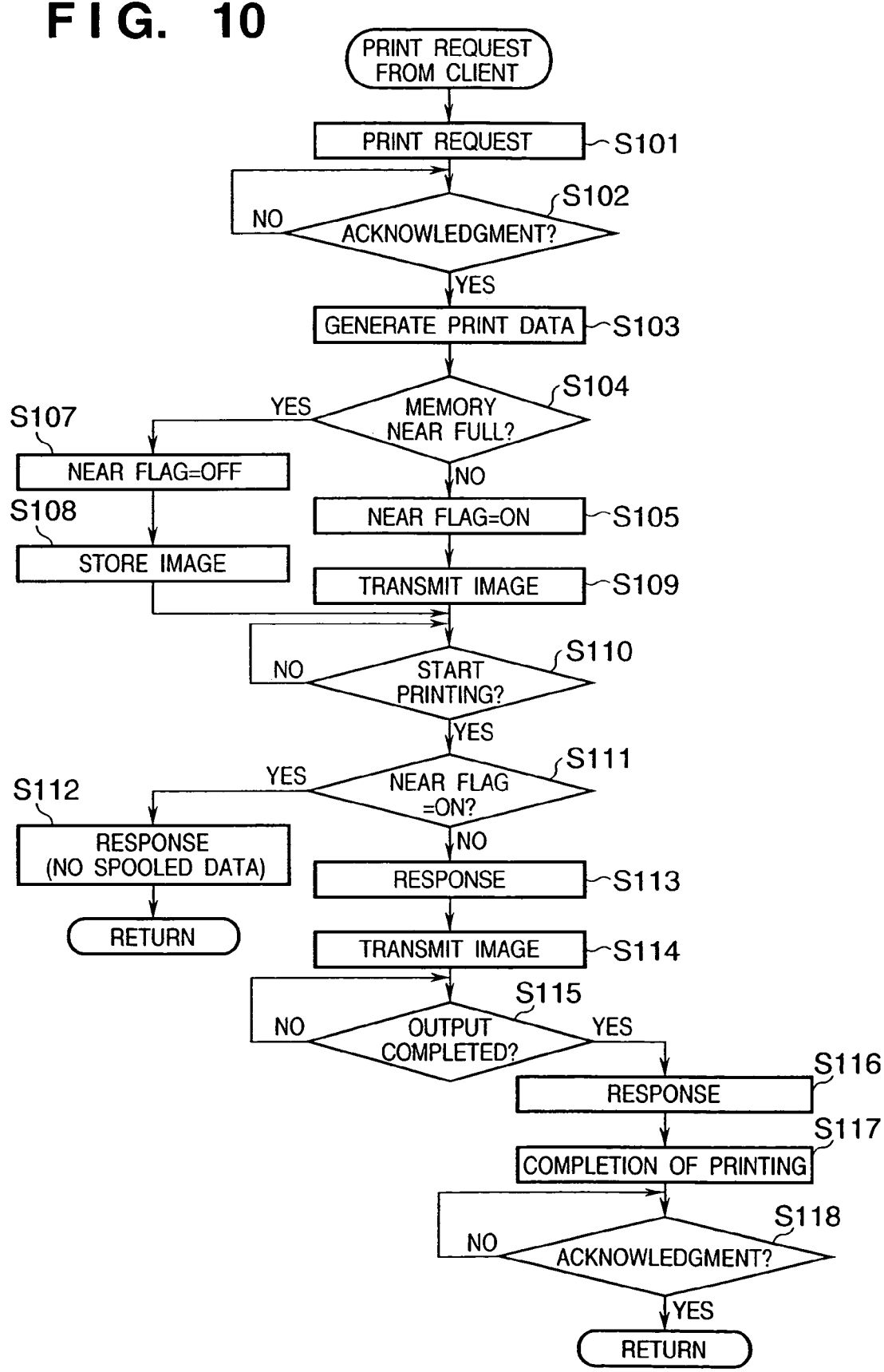
FIG. 10 is a flowchart showing the operation of the system to automatically disable one of the spool functions.

FIG. 10 is a flowchart showing the operation of the system to automatically disable one of the spool functions in correspondence with the status of the image manager 25. This flowchart shows the operation of the client to issue a print request to the server.

First, at step S101, the client transmits the print request information (301 in FIG. 3) to the server. The process proceeds to step S102, at which the reception of print request acknowledgment information (303 in FIG. 3) as an acknowledgment message from the server is waited. When the acknowledgment message from the server is received, the process proceeds to step S103, at which print data as an image to be print-outputted is generated by the printer driver. Further, an EMF file as intermediate data generated by the OS at this time is also obtained. When the print data is generated, the process proceeds to step S104, at which the client determines whether or not the image manager 25 as a spooler of the client has a sufficient remaining memory capacity.

If it is determined that the memory capacity is not sufficient to store the print image (memory near-full status), the process proceeds to step S105, at which the CPU 22 of the client turns a flag Nearflag ON. The flag Nearflag indicative of memory near-full status is stored in the RAM 24. The print data is not stored into the spooler of the client. The process proceeds to step S109, at which the client transmits the print data and the EMF file, with spool designation information indicating that the server spool function is to be used, to the server. The server spools the print data and the EMF file received from the client, in correspondence with the print request information, into the image manager 25.

On the other hand, if it is determined that the remaining memory capacity is sufficient, the process proceeds to step S107, at which the CPU 22 of the client turns the flag Nearflag OFF, and stores the print data as a print image and the EMF file into the image manager 25 as a spooler of the client (304 in FIG. 3) at step S108. The threshold value used for determination of memory near-full status may be a predetermined value or may be a value set by the user.

When the print data and the EMF file have been spooled in the client or the server, the process proceeds to step S110.

At step S110, the client waits for reception of transmission permission information (307 in FIG. 3), as a print start message indicating that the client's turn to perform printing has come, from the server. When the print start message is received, the flag Nearflag is referred to at step S111. If the flag is ON, the process proceeds to step S112, at which a parameter indicating "no spooled data" is set in a response message to the print start message, and the message is sent to the server. The server receives the message, and as in the processing at step S410 in FIG. 4, performs print-outputting by using the spooler of the server. Further, it may be arranged such that if it is recognized in the server that the client is already in a memory full status and the print data and the EMF file are spooled in the image manager of the server, the server does not send the transmission permission to the client, but transmits the print data to the printer and only notifies the client of the completion of printing.

If it is determined at step S111 the flag Nearflag is OFF, the process proceeds to step S113, at which the permission acknowledgment information (308 in FIG. 3) as a response message is transmitted to the server. Then at step S114, the print data as a print image is directly sent from the client to the printer (309 in FIG. 3). At step S115, it is determined whether or not all the print data of the print job has been transmitted to the printer. When all the print data has been transmitted, the output completion message (311 in FIG. 3) from the printer is waited at step S116. After the reception of the message, i.e., when the print outputting by the printer has been completed (step S117), the client notifies the server of the completion of printing (313 in FIG. 3) at step S118. Upon reception of acknowledgment of printing completion from the server, the client deletes the print data and the EMF file stored in the image manager 25.

As described above, in the third embodiment of the present invention, it is automatically determined whether or not the spooler of the client is to be used, in accordance with whether or not the memory is in a near-full status. In addition, it may be arranged such that the spooler of the server is also set to be automatically started. In the third embodiment, the remaining memory capacity of the image manager is used, as an example, for automatic determination for use of the spooler of the client, however, use of spooler may be determined based on other device settings, application used there or the like.

As described above, in the third embodiment of the present invention, the spool functions of the client and the server are set in available status, and the system of the client automatically determines one of the spool functions to be used. Thus a more appropriate spool function is used.

Next, the print server system according to a fourth embodiment of the present invention will be described with reference to the drawings.

The print server system of the fourth embodiment has a purpose that the content of a document, to be printed from any of the spool functions of the server and the client, can be previewed on the client.

The construction of the print server system of the present embodiment is the same as that shown in FIGS. 1 and 2.

Next, a case where a print image spooled in the server or the client is previewed in the print server system of the present embodiment will be described.

FIG. 11 is an example of screen image of the manager showing print jobs managed by the server. The display of this user interface image is controlled by the above-described utility software of the client. The software accesses the server and obtains job list information, to display the print jobs managed by the server, in list form. In the present embodiment, a preview display of a print image is designated from the client. The information displayed in the screen image is information managed by the server. Three documents are stacked in a printer queue. In FIG. 11, as it is understood from the numbers displayed as client names, different clients have requested to print these documents.

In this screen image, a Document 1 is selected by a mouse cursor. From this status, a preview function can be started. The preview function is to display a brief image of a document to be printed on the display screen.

Figure 12:
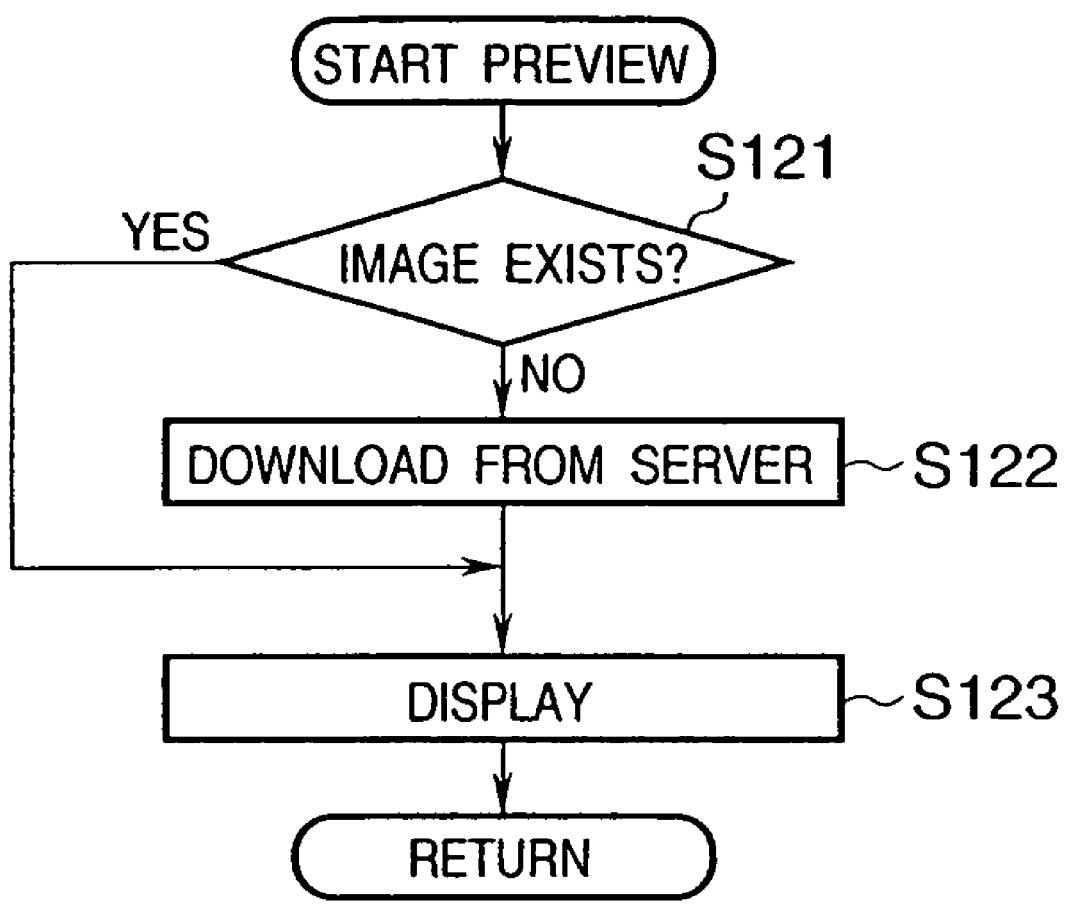
FIG. 12 is a flowchart showing the operation upon start of preview function.

FIG. 12 is a flowchart showing the operation upon start of preview function. The above-mentioned utility software of the client performs communication with the server via the network, and based on a job list obtained from the server, displays the user interface screen image as shown in FIG. 11 on the display unit of the client. In the user interface screen image, the user selects a job and clicks an OK button 1101 by using a pointing device such as a mouse, and then the present processing is executed.

First, at step S121, the client determines whether or not the print data and the EMF file of the job selected in the user interface screen image exist in the image manager of the client. If the client determines that the print data and the EMF file do not exist in the image manager of the client, the process proceeds to step S122. At step S122, the client downloads the EMF file from the server and stores it into the image manager. At step S123, the client reads the EMF file from the image manager of the client, and forwards the EMF file to the Win32API as the drawing means provided by the OS. Then the client causes the Win32API to display-output the EMF file, and displays a preview image on the display unit.

In this manner, in a case where the server and the client both have a spooler, if an image exists in the client upon start of preview function, time necessary to download the print image from the server can be omitted.

As in the case of the first embodiment, in the above second to fourth embodiments, it may be arranged such that a storage medium (or recording medium) storing program code of software for realizing the functions of the embodiments is provided to a system or an apparatus, and a computer (e.g., CPU, MPU) of the system or apparatus reads the program code from the storage medium, then executes the program.

Figure 13:
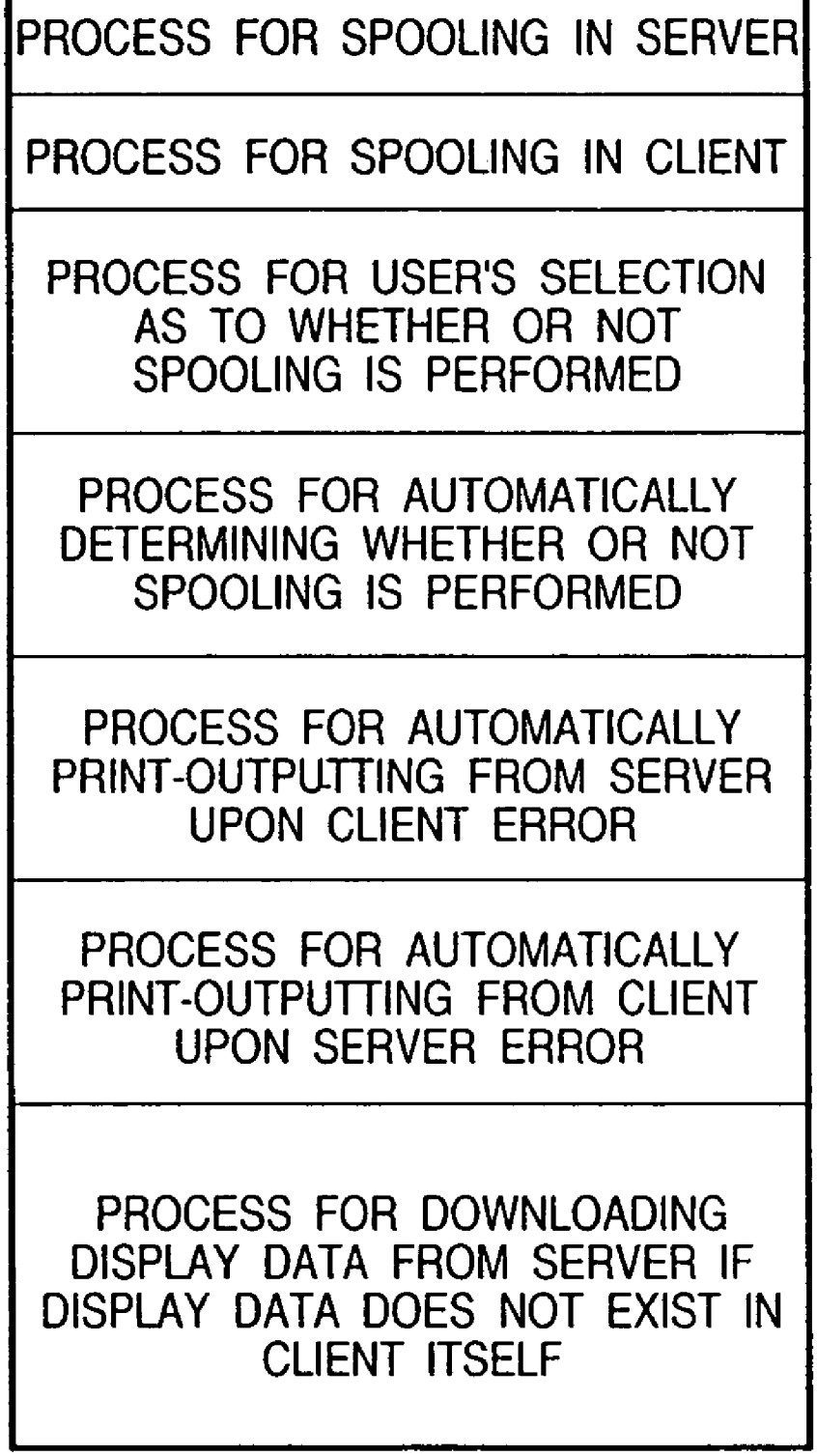
FIG. 13 is a table showing processes stored in a storage medium to realize second to fourth embodiments of the present invention.

FIG. 13 is a table showing processes stored in a storage medium to realize the second to fourth embodiments of the present invention. In this case, the storage medium contains processes necessary for both server and client, and only necessary processes are executed in correspondence with the server or client to operate.

As described above, according to the print server system of the second to fourth embodiments, the following advantages can be obtained.

(1) As the server and the client both have a spooler, printing can be ensured even if one of the spoolers has a trouble.

(2) As the user can set whether or not the server and the client respectively perform spooling, the system can provide high operability corresponding to the user's requirements.

(3) In a state where the server and the client both have a spooler, if the client detects the occurrence of abnormal condition such as memory-full status, it automatically disables its spool function. Thus an appropriate spool function can be used even upon occurrence of abnormal condition such as memory-full status without the user's operation.

(4) When a spool function is used, print data and an intermediate file (EMF file in the Windows OS) are stored, so as to facilitate preview display by using OS function of the client. Further, when the client performs the preview function on a job, if the client spools an intermediate file, downloading the file from the server is not necessary. This reduces traffic on the LAN, and achieve efficient use of the LAN.

As many apparently widely different embodiments of the present invention can be made without departing from the spirit and scope thereof, it is to be understood that the invention is not limited to the specific embodiments thereof except as defined in the appended claims.

What is claimed is:

1. A server apparatus adapted to communicate with at least one client, each client including an image storage unit for storing print data of a print job, and a printer via a network, comprising:
    image storage means for storing the print data of the print job to be executed according to a print request from a client;
    order management means for managing a print order of the print job to be executed according to the print request from the client;
    transmission means for transmitting transmission permission information to the client based on the print order managed by said order management means, the transmission permission information indicating that the print data may be transmitted to said printer;
    termination means for determining whether a message, which indicates that the printing process of the print data has finished, is received from the client within a predetermined time in response to the transmission permission information; and
    control means for transmitting the print data of the print job of the print order from said image storage means to the printer when said determination means determines that the message is not received.

2. The server apparatus according to claim 1, wherein, if the print data of the print job to be executed by the print request from the client cannot be stored in said image storage means, causing said order management means to manage the print order of the print job without storing the print data of the print job in said image storage means.

3. The server apparatus according to claim 1, further comprising history storage means for, with each print job outputted by the printer, storing information indicative of a client that requested the print job and a device that transmitted print data to the printer.

4. A print managing method for a server apparatus adapted to communicate with at least one client, each client including an image storage unit for storing print data of a print job, and a printer via a network, comprising:
    an image storage step of storing print data of a print job, to be executed according to a print request from a client, in image storage means;
    an order management step of managing a print order of the print job to be executed according to the print request from the client;
    a transmission step of transmitting transmission permission information to the client based on the print order managed at said order management step, the transmission permission information indicating that the print data may be transmitted to the printer;
    a determination step of determining whether a message, which indicates that the printing process of the print data has finished, is received from the client within a predetermined time in response to the transmission permission information; and
    a control step of transmitting the print data of the print job of the print order from the image storage means to the printer when it is determined in said determination step that the message is not received.

5. The print managing method according to claim 4, wherein, if the print data of the print job to be executed according to the print request from the client cannot be stored in the image storage means, managing the print order of the print job at said order management step without storing the print data of the print job in the image storage means.

6. The print managing method according to claim 4, further comprising a history storage step of, which each print job outputted by the printer, storing information indicative of a client that requested the print job and a device that transmitted print data to the printer.

7. A storage medium storing a program for implementing a print managing method for a server apparatus adapted to communicate with at least one client, each client including an image storage unit for storing print data of a print job, and a printer via a network, wherein the method comprises:
    an image storage step of storing print data of a print job, to be executed according to a print request from the client, in image storage means;
    an order management step of managing a print order of the print job to be executed according to the print request from the client;
    a transmission step of transmitting transmission permission information to the client based on the print order managed at said order management step, the transmission permission information indicating that the print data may be transmitted to the printer;
    a determination step of determining whether a message which indicates that the printing process of the print data stored in the image storage unit has finished, is received from the client within a predetermined time in response to the transmission permission information; and
    a control step of transmitting the print data of the print job of the print order from the image storage means to the printer when it is determined in said determination step that the message is not received.

8. An information processing apparatus as a client that communicates with a server apparatus, which manages a print order and has a spool unit for storing print data, and a printer via a network, comprising:

sending means for sending job information, which does not include print data, to the server apparatus so that the server apparatus manages a print order according to the job information;

image storage means for storing print data of a print job corresponding to the job information so that the information processing apparatus may directly transmit the print data to the printer without intervention of the server apparatus;

selection means for causing a user to select one of a spool function of said image storage means and a spool function of the server apparatus via a user interface, which is adapted to store the print data of the print job to be executed according to the print request to the server apparatus;

determination means for determining whether the spool function of said image storage means is selected or the spool function of the server apparatus is selected by said selection means;

control means for, if it is determined by said determination means to use the spool function of the server apparatus, transmitting the print data to the server apparatus, whereas, if it is determined by said determination means to use the spool function of said image storage means, controlling said image storage means to store the print data and controlling said sending means to send the job information;

receiving means for receiving transmission permission information from the server apparatus indicating that the print data may be transmitted to the printer when the print data is stored in said image storage means; and transmission means for transmitting the print data to the printer when said receiving means receives the transmission permission information from the server apparatus.

9. The information processing apparatus according to claim 8, further comprising notification means for notifying the server apparatus of the selected spool function.

10. The information processing apparatus according to claim 8, wherein said selection means causes the user to make a selection by displaying a screen image of a user interface.

11. A print managing method for an information processing apparatus as a client that communicates with a server apparatus, which manages a print order and which has a spool unit for storing print data, and a printer via a network, comprising:

a sending step of sending job information, which does not include print data, to the server apparatus so that the server apparatus manages a print order according to the job information;

an image storage step of storing in image storing means print data of a print job, corresponding to the job information so that the information processing apparatus directly transmits the print data to the printer without intervention of the server apparatus;

a selection step of causing a user to select one of a spool function of the image storage means and a spool function of the server apparatus via a user interface, which is adapted to store the print data of the print job to be executed according to the print request to the server apparatus;

a determination step of determining whether the spool function of the image storage means is selected or the spool function of the server apparatus is selected in said selection step; and a control step of, if it is determined in said determination step that the spool function of the server apparatus is to be used, transmitting the print data to the server apparatus, such that the server apparatus directly transmits the print data to the printer whereas, if it is determined in said determination step that the spool function of the image storage means is to be used, controlling the image storage means to store the print data and controlling said sending step to send the job information;

a reception step of receiving transmission permission information from the server apparatus indicating that the print data may be transmitted to the printer when the print data is stored in said image storage means; and a transmission step of transmitting the print data to the printer when the transmission permission information is received from the server apparatus at said reception step.

12. The print managing method according to claim 11, further comprising a notification step of notifying the server apparatus of the selected spool function.

13. The print managing method according to claim 11, wherein, at said selection step, a screen image of a user interface is displayed to cause the user to make a selection.

14. A storage medium storing a program for implementing a print managing method for an information processing apparatus as a client that communicates with a server apparatus, which manages a print order and has a spool unit for storing print data, and a printer via a network, wherein the method comprises:

a sending step of sending job information, which does not include print data, to the server apparatus so that the server apparatus manages a print order according to the job information;

an image storage step of storing in image storage means print data of a print job corresponding to the job information so that the information processing apparatus directly transmits the print data to the printer without intervention of the server apparatus;

a selection step of causing a user to select one of a spool function of the image storage means and a spool function of the server apparatus via a user interface, which is adapted to store the print data of the print job to be executed according to the print request to the server apparatus;

a determination step of determining whether the spool function of the image storage means is selected or the spool function of the server apparatus is selected in said selection step; and a control step of, if it is determined in said determination step that the spool function of the server apparatus is to be used, transmitting the print data to the server apparatus, such that the server apparatus directly transmits the print data to the printer, whereas, if it is determined in said determination step that the spool function of the image storage means is to be used, controlling the image storage means to store the print data and controlling said sending step to send the job information;

a reception step of receiving transmission permission information from the server apparatus indicating that the print data may be transmitted to the printer when the print data is stored in said image storage means; and a transmission step of transmitting the print data to the printer when the transmission permission information is received from the server apparatus at said reception step.

15. An information processing apparatus as a client that communicates with a server apparatus, which manages a print order and has a spool unit for storing print data, and a printer via a network, comprising:

image storage means for storing print data of a print job to be executed according to a print request so that the information processing apparatus directly transmits the print data to the printer without intervention of the server apparatus;

determination means for determining to use one of a spool function of said image storage means and a spool function of the server apparatus based on a condition of said image storage means, the spool function being adapted to store the print data of the print job to be executed according to the print request to the server apparatus;

control means for, if said determination means determines to use the spool function of the server apparatus, transmitting the print data to the server apparatus, whereas, if said determination means determines to use the spool function of said image storage means, controlling said image storage means to store the print data;

receiving means for receiving transmission permission information from the server apparatus indicating the print data may be transmitted to the printer when the print data is stored in said image storage means; and transmission means for transmitting the print data to the printer when said receiving means receives the transmission permission information from the server apparatus.

16. The information processing apparatus according to claim 15, further comprising notification means for notifying the server apparatus of the determined spool function.

17. The information processing apparatus according to claim 15, wherein said determination means makes a determination according to whether or not a remaining capacity of said image storage means is equal to or less than a predetermined amount of capacity.

18. A print managing method for an information processing apparatus as a client that communicates with a server apparatus, which manages a print order and has a spool unit for storing print data, and a printer via a network, comprising:

an image storage step of storing print data of a print job, to be executed according to a print request so that the information processing apparatus directly transmits the print data to the printer without intervention of the server apparatus, in image storage means;

a determination step of determining to use one of a spool function of the image storage means and a spool function of the server apparatus based on a condition of said image storage means, the spool function being adapted to store the print data of the print job to be executed according to the print request to the server apparatus;

a control step of, if it is determined at said determination step that the spool function of the server apparatus is to be used, transmitting the print data to the server apparatus such that the server apparatus directly transmits the print data to the printer, whereas, if it is determined at said determination step that the spool function of the image storage means is to be used, controlling the image storage means to store the print data;

a reception step of receiving transmission permission information from the server apparatus indicating that the print data may be transmitted to the printer when the print data is stored in said image storage means; and a transmission step of transmitting the print data to the printer when the transmission permission information is received from the server apparatus at said reception step.

19. The print managing method according to claim 18, further comprising a notification step of notifying the server apparatus of the determined spool function.

20. The print managing method according to claim 18, wherein, at said determination step, a determination is made according to whether or not a remaining capacity of the image storage means is equal to or less than a predetermined amount of capacity.

21. A storage medium storing a program for implementing a print managing method for an information processing apparatus as a client that communicates with a server apparatus, which manages a print order and has a spool unit for storing print data, and a printer via a network, wherein the method comprises:

an image storage step of storing print data of a print job, to be executed according to a print request, in image storage means, so that the information processing apparatus directly transmits the print data to the printer without intervention of the server apparatus;

a determination step of determining to use one of a spool function of the image storage means and a spool function of the server apparatus based on a condition of said image storage means, the spool function being adapted to store the print data of the print job to be executed according to the print request to the server apparatus;

a control step of, if it is determined at said determination step that the spool function of the server apparatus is to be used, transmitting the print data to the server apparatus such that the server apparatus directly transmits the print data to the printer, whereas, if it is determined at said determination step that the spool function of the image storage means is to be used, controlling the image storage means to store the print data;

a reception step of receiving transmission permission information from the server apparatus indicating that the print data may be transmitted to the printer when the print data is stored in said image storage means; and a transmission step of transmitting the print data to the printer when the transmission permission information is received from the server apparatus at said reception step.

22. An information processing apparatus as a client that communicates with a server apparatus, which manages a print order and has a spool unit for storing a print job and intermediate data of the print job, and a printer via a network, comprising:

image storage means for storing the print job and the intermediate data of the print job to be executed according to a print request such that the information processing apparatus directly transmits the print job to the printer without intervention of the server apparatus;

list acquisition means for acquiring a list of print jobs managed by the server apparatus;

job designation means for designating a print job to be previewed based on the list of print jobs acquired by said list acquisition means;

determination means for determining whether the intermediate data of the print job designated by said job designation means is stored in said image storage means or in the spool unit of the server apparatus;

intermediate data acquisition means for, if it is determined by said determination means that the intermediate data of the print job designated by said job designation means is stored in said image storage means, reading the intermediate data from said image storage means, whereas, if it is determined by said determination means that the intermediate data is stored in the server apparatus, downloading the intermediate data from the server apparatus; and control means for displaying a preview image based on the intermediate data acquired by said intermediate data acquisition means.

23. The information processing apparatus according to claim 22, wherein said job designation means causes a user to make a designation by displaying a screen image of a user interface.

24. The information processing apparatus according to claim 22, wherein the image data is an EMF file comprising intermediate data.

25. The information processing apparatus according to claim 24, wherein said control means displays the preview image by controlling a display function of an Operating System to execute the acquired EMF file.

26. A print managing method for an information processing apparatus as a client that communicates with a server apparatus, which manages a print order and has a spool unit for storing a print job and intermediate data of the print job, and a printer via a network, comprising:

an image storage step of storing the print job and the intermediate data of the print job, to be executed according to a print request, in image storage means, such that the information processing apparatus directly transmits the print job to the printer without intervention of the server apparatus;

a list acquisition step of acquiring a list of print jobs managed by the server apparatus;

a job designation step of designating a print job to be previewed based on the list of print jobs acquired at said list acquisition step;

a determination step of determining whether the intermediate data of the print job designated at said job designation step is stored in the image storage means or in the spool unit of the server apparatus;

an intermediate data acquisition step of, if it is determined at said determination step that the data of the print job designated at said job designation step is stored in the image storage means, reading the intermediate data from the image storage means, whereas, if it is determined at said determination step that the intermediate data is stored in the server apparatus, downloading the intermediate data from the server apparatus; and a control step of displaying a preview image based on the intermediate data acquired at said intermediate data acquisition step.

27. The print managing method according to claim 26, wherein, at said job designation step, a screen image of a user interface is displayed to cause a user to make designation.

28. The print managing method according to claim 26, wherein the image data is an EMF file comprising intermediate data.

29. The print managing method according to claim 28, wherein, at said control step, the preview image is displayed by controlling a display function of an Operating System to execute the acquired EMF file.

30. A storage medium storing a program for implementing a print managing method for an information processing apparatus as a client that communicates with a server apparatus, which manages a print order and has a spool unit for storing a print job and intermediate data of the print job, and a printer via a network, wherein the method comprises:

an image storage step of storing the print job and the intermediate data of the print job, to be executed according to a print request, in image storage means, such that the information processing apparatus directly transmits the print job to the printer without intervention of the server apparatus;

a list acquisition step of acquiring a list of print jobs managed by the server apparatus;

a job designation step of designating a print job to be previewed based on the list of print jobs acquired at said list acquisition step;

a determination step of determining whether the intermediate data of the print job designated at said job designation step is stored in the image storage means or in the spool unit of the server apparatus;

an intermediate data acquisition step of, if it is determined at said determination step that the intermediate data of the print job designated at said job designation step is stored in the image storage means, reading the intermediate data from the image storage means, whereas, if it is determined at said determination step that the intermediate data is stored in the server apparatus, downloading the intermediate data from the server apparatus; and a control step of displaying a preview image based on the intermediate data acquired at said intermediate data acquisition step.

31. The server apparatus according to claim 1, wherein:

the transmission permission information is such that the client directly transmits the print data to the printer without intervention of the server apparatus;

the message indicates that the printing process of the print data stored in the image storage unit of the client has finished; and the control means transmits the print data of the print job of the print order from said image storage means to the printer instead of from the image storage unit of the client when said determination means determines that the message is not received.

32. The print managing method according to claim 4, wherein:

the transmission permission information is such that the client directly transmits the print data to the printer without intervention of the server apparatus;

the message indicates that the printing process of the print data stored in the image storage unit of the client has finished; and the control step transmits the print data of the print job of the print order from said image storage means to the printer instead of from the image storage unit of the client when said determination means determines that the message is not received.

33. The storage medium according to claim 7, wherein:

the transmission permission information is such that the client directly transmits the print data to the printer without intervention of the server apparatus;

the message indicates that the printing process of the print data stored in the image storage unit of the client has finished; and the control step transmits the print data of the print job of the print order from said image storage means to the printer instead of from the client when said determination means determines that the message is not received.

34. The information processing apparatus according to claim 8, wherein transmitting the print data to the server apparatus is done such that the server apparatus directly transmits the print data to the printer.

35. The print managing method according to claim 11, wherein transmitting the print data to the server apparatus is done such that the server apparatus directly transmits the print data to the printer.

36. The storage medium according to claim 14, wherein transmitting the print data to the server apparatus is done such that the server apparatus directly transmits the print data to the printer.

37. The information processing apparatus according to claim 15, wherein transmitting the print data to the server apparatus is done such that the server apparatus directly transmits the print data to the printer.

38. The print managing method according to claim 18, wherein transmitting the print data to the server apparatus is done such that the server apparatus directly transmits the print data to the printer.

39. The storage medium according to claim 21, wherein transmitting the print data to the server apparatus is done such that the server apparatus directly transmits the print data to the printer.

40. The data processing apparatus according to claim 22, wherein the intermediate data of the print job is stored in the spool unit of the server apparatus such that the server apparatus directly transmits the print job to the printer.

41. The print managing method according to claim 26, wherein the intermediate data of the print job is stored in the spool unit of the server apparatus such that the server apparatus directly transmits the print job to the printer.

42. The storage medium according to claim 30, wherein the intermediate data of the print job is stored in the spool unit of the server apparatus such that the server apparatus directly transmits the print job to the printer.

* * * * *

UNITED STATES PATENT AND TRADEMARK OFFICE
CERTIFICATE OF CORRECTION

PATENT NO. : 6,985,243 B1
APPLICATION NO. : 09/512358
DATED : January 10, 2006
INVENTOR(S) : Kazutaka Matsueda It is certified that error appears in the above-identified patent and that said Letters Patent is hereby corrected as shown below:

COLUMN 8:
Line 23, "data indicative" should read -- data is indicative --.

COLUMN 9:
Lines 60 and 66, "is" should be deleted.

COLUMN 13:
Claim 1 should read:

--1. A server apparatus adapted to communicate with at least one client, each client including an image storage unit having a spool function, the image storage unit for storing print data of a print job, and a printer via a network, comprising:
　　image storage means for storing the print data of the print job to be executed according to a print request from a client;
　　order management means for managing a print order of the print job to be executed according to the print request from the client;
　　transmission means for transmitting transmission permission information to the client based on the print order managed by said order management means, the transmission permission information indicating that the print data may be transmitted to said printer, such that the client directly transmits the print data to the printer without intervention of the server apparatus if the spool function of the image storage unit of said client is selected by a user;
　　determination means for determining whether a message, which indicates that the printing process of the print data has finished, is received from the client within a predetermined time in response to the transmission permission information; and
　　control means for transmitting the print data of the print job of the print order from said image storage means instead of the client to the printer when said determination means determines that the message is not received.--

COLUMN 14:
Line 35, "which" should read -- with --;

Claim 4 should read:

--4. A print managing method for a server apparatus adapted to communicate with a least one client, each client including an image storage unit having a spool function, the image storage unit for storing print data of a print job, and a printer via a network, comprising:
　　an image storage step of storing print data of a print job, to be executed according to a print request from a client, in image storage means;

UNITED STATES PATENT AND TRADEMARK OFFICE
CERTIFICATE OF CORRECTION

PATENT NO. : 6,985,243 B1
APPLICATION NO. : 09/512358
DATED : January 10, 2006
INVENTOR(S) : Kazutaka Matsueda It is certified that error appears in the above-identified patent and that said Letters Patent is hereby corrected as shown below:

Claim 4 (cont'd)
    an order management step of managing a print order of the print job to be executed according to the print request from the client;
    a transmission step of transmitting transmission permission information to the client based on the print order managed at said order management step, the transmission permission information indicating that the print data may be transmitted to the printer, such that the client directly transmits the print data to the printer without intervention of the server apparatus if the spool function of the image storage unit of said client is selected by a user;
    a determination step of determining whether a message, which indicates that the printing process of the print data has finished is received from the client within a predetermined time in response to the transmission permission information; and
    a control step of transmitting the print data of the print job of the print order from the image storage means instead of the client to the printer when it is determined in said determination step that the message is not received.--

Claim 7 should read:

--7. A computer readable storage medium storing a program for implementing a print managing method for a server apparatus adapted to communicate with at least one client, each client including an image storage unit having a spool function, the image storage unit for storing print data of a print job, and a printer via a network, wherein the method comprises:
    an image storage step of storing print data of a print job, to be executed according to a print request from the client, in image storage means;
    an order management step of managing a print order of the print job to be executed according to the print request from the client;
    a transmission step of transmitting transmission permission information to the client based on the print order managed at said order management step, the transmission permission information indicating that the print data may be transmitted to the printer, such that the client directly transmits the print data to the printer without intervention of the server apparatus if the spool function of the image storage unit of said client is selected by a user;
    a determination step of determining whether a message which indicates that the printing process of the print data stored in the image storage unit has finished is received from the client within a predetermined time in response to the transmission permission information; and
    a control step of transmitting the print data of the print job of the print order from the image storage means instead of the client to the printer when it is determined in said determination step that the message is not received.--

UNITED STATES PATENT AND TRADEMARK OFFICE
CERTIFICATE OF CORRECTION

| | | |
|---|---|---|
| PATENT NO. | : 6,985,243 B1 | |
| APPLICATION NO. | : 09/512358 | |
| DATED | : January 10, 2006 | |
| INVENTOR(S) | : Kazutaka Matsueda | |

It is certified that error appears in the above-identified patent and that said Letters Patent is hereby corrected as shown below:

Claim 8 should read:

--8. An information processing apparatus as a client, including a storage unit having a spool function, that communicates with a server apparatus, which manages a print order and has a spool unit for storing print data, and a printer via a network, comprising:
    sending means for sending job information, which does not include print data, to the server apparatus so that the server apparatus manages a print order according to the job information;
    image storage means for storing print data of a print job corresponding to the job information so that the information processing apparatus may directly transmit the print data to the printer without intervention of the server apparatus if the spool function of the image storage unit of said client is selected by a user;
    selection means for causing a user to select one of a spool function of said image storage means and a spool function of the server apparatus via a user interface, which is adapted to store the print data of the print job to be executed according to the print request to the server apparatus;
    determination means for determining whether the spool function of said image storage means is selected or the spool function of the server apparatus is selected by said selection means;
    control means for, if it is determined by said determination means to use the spool function of the server apparatus, transmitting the print data to the server apparatus, whereas, if it is determined by said determination means to use the spool function of said image storage means, controlling said image storage means to store the print data and controlling said sending means to send the job information;
    receiving means for receiving transmission permission information from the server apparatus indicating that the print data may be transmitted to the printer when the print data is stored in said image storage means; and
    transmission means for transmitting the print data to the printer when said receiving means receives the transmission permission information from the server apparatus.--

COLUMN 15:
Claim 11 should read:

--11. A print managing method for an information processing apparatus as a client, including a storage unit having a spool function, that communicates with a server apparatus, which manages a print order and has a spool unit for storing print data, and a printer via a network, comprising:
    a sending step of sending job information, which does not include print data, to the server apparatus so that the server apparatus manages a print order according to the job information;

UNITED STATES PATENT AND TRADEMARK OFFICE
CERTIFICATE OF CORRECTION

| | | |
|---|---|---|
| PATENT NO. | : 6,985,243 B1 | |
| APPLICATION NO. | : 09/512358 | |
| DATED | : January 10, 2006 | |
| INVENTOR(S) | : Kazutaka Matsueda | |

It is certified that error appears in the above-identified patent and that said Letters Patent is hereby corrected as shown below:

an image step of storing print data of a print job corresponding to the job information so that the information processing apparatus may directly transmit the print data to the printer without intervention of the server apparatus if the spool function of the image storage unit of said client is selected by a user;

a selection step of causing a user to select one of a spool function of said image storage means and a spool function of the server apparatus via a user interface, which is adapted to store the print data of the print job to be executed according to the print request to the server apparatus;

a determination step of determining whether the spool function of said image storage means is selected or the spool function of the server apparatus is selected by said selection means;

a control step of, if it is determined by said determination means to use the spool function of the server apparatus, transmitting the print data to the server apparatus, whereas, if it is determined by said determination means to use the spool function of said image storage means, controlling said image storage means to store the print data and controlling said sending means to send the job information;

a receiving step of receiving transmission permission information from the server apparatus indicating that the print data may be transmitted to the printer when the print data is stored in said image storage means; and a transmission step for transmitting the print data to the printer when said receiving means receives the transmission permission information from the server apparatus.--

COLUMN 16:
Claim 14 should read:

--14. A computer readable medium storing a program for implementing a print managing method for an information processing apparatus as a client, including a storage unit having a spool function, that communicates with a server apparatus, which manages a print order and has a spool unit for storing print data, and a printer via a network, comprising:

a sending step of sending job information, which does not include print data, to the server apparatus so that the server apparatus manages a print order according to the job information;

an image step of storing print data of a print job corresponding to the job information so that the information processing apparatus may directly transmit the print data to the printer without intervention of the server apparatus if the spool function of the image storage unit of said client is selected by a user;

UNITED STATES PATENT AND TRADEMARK OFFICE
CERTIFICATE OF CORRECTION

| | | |
|---|---|---|
| PATENT NO. | : 6,985,243 B1 | |
| APPLICATION NO. | : 09/512358 | |
| DATED | : January 10, 2006 | |
| INVENTOR(S) | : Kazutaka Matsueda | |

It is certified that error appears in the above-identified patent and that said Letters Patent is hereby corrected as shown below:

Claim 14 (cont'd)
    a selection step of causing a user to select one of a spool function of said image storage means and a spool function of the server apparatus via a user interface, which is adapted to store the print data of the print job to be executed according to the print request to the server apparatus;
    a determination step of determining whether the spool function of said image storage means is selected or the spool function of the server apparatus is selected by said selection means;
    a control step of, if it is determined by said determination means to use the spool function of the server apparatus, transmitting the print data to the server apparatus, whereas, if it is determined by said determination means to use the spool function of said image storage means, controlling said image storage means to store the print data and controlling said sending means to send the job information;
    a receiving step of receiving transmission permission information from the server apparatus indicating that the print data may be transmitted to the printer when the print data is stored in said image storage means; and
    a transmission step of transmitting the print data to the printer when said receiving means receives the transmission permission information from the server apparatus.--

COLUMN 17:
Claim 15 should read:

--15. An information processing apparatus as a client including an image storage unit having a spool function, that communicates with a server apparatus, which manages a print order and has a spool unit for storing print data, and a printer via a network, comprising:
    image storage means for storing print data of a print job to be executed according to a print request so that the information processing apparatus directly transmits the print data to the printer without intervention of the server apparatus if the spool function of the said client is selected by a user;
    determination means for determining to use one of a spool function of said image storage means and a spool function of the server apparatus based on a condition of said image storage means, the spool function being adapted to store the print data of the print job to be executed according to the print request to the server apparatus;
    control means for, if said determination means determines to use the spool function of the server apparatus, transmitting the print data to the server apparatus, such that the server apparatus directly transmits the print data to the printer, whereas, if said determination means determines to use the spool function of said image storage means, controlling said image storage means to store the print data;

UNITED STATES PATENT AND TRADEMARK OFFICE
CERTIFICATE OF CORRECTION

| | |
|---|---|
| PATENT NO. | : 6,985,243 B1 |
| APPLICATION NO. | : 09/512358 |
| DATED | : January 10, 2006 |
| INVENTOR(S) | : Kazutaka Matsueda |

It is certified that error appears in the above-identified patent and that said Letters Patent is hereby corrected as shown below:

Claim 15 (cont'd)
    receiving means for receiving transmission permission information from the server apparatus indicating the print data may be transmitted to the printer when the print data is stored in said image storage means; and
    transmission means for transmitting the print data to the printer when said receiving means receives the transmission permission information from the server apparatus.--

Claim 18 should read:

--18. A print managing method for an information processing apparatus as a client including an image storage unit having a spool function, that communicates with a server apparatus, which manages a print order and has a spool unit for storing print data, and a printer via a network, comprising:
    an image storage step of storing print data of a print job to be executed according to a print request so that the information processing apparatus directly transmits the print data to the printer without intervention of the server apparatus, in image storage step, if the spool function of the said client is selected by a user;
    a determination step of determining to use one of a spool function of said image storage step and a spool function of the server apparatus based on a condition of said image storage step, the spool function being adapted to store the print data of the print job to be executed according to the print request to the server apparatus;
    a control step of, if said determination step determines to use the spool function of the server apparatus, transmitting the print data to the server apparatus, such that the server apparatus directly transmits the print data to the printer, whereas, if said determination step determines to use the spool function of said image storage means, controlling said image storage step to store the print data;
    a receiving step of receiving transmission permission information from the server apparatus indicating the print data may be transmitted to the printer when the print data is stored in said image storage step; and
    a transmission step of transmitting the print data to the printer when said receiving step receives the transmission permission information from the server apparatus.--

UNITED STATES PATENT AND TRADEMARK OFFICE
CERTIFICATE OF CORRECTION

| | |
|---|---|
| PATENT NO. | : 6,985,243 B1 |
| APPLICATION NO. | : 09/512358 |
| DATED | : January 10, 2006 |
| INVENTOR(S) | : Kazutaka Matsueda |

It is certified that error appears in the above-identified patent and that said Letters Patent is hereby corrected as shown below:

COLUMN 18:
Claim 21 should read:

--21. A computer readable medium storing a program for implementing a print method for an information processing apparatus as a client including an image storage unit having a spool function, that communicates with a server apparatus, which manages a print order and has a spool unit for storing print data, and a printer via a network, comprising:
    an image storage step of storing print data of a print job to be executed according to a print request so that the information processing apparatus directly transmits the print data to the printer without intervention of the server apparatus, in image storage means, if the spool function of the said client is selected by a user;
    a determination step of determining to use one of a spool function of said image storage step and a spool function of the server apparatus based on a condition of said image storage step, the spool function being adapted to store the print data of the print job to be executed according to the print request to the server apparatus;
    a control step of, if said determination step determines to use the spool function of the server apparatus, transmitting the print data to the server apparatus, such that the server apparatus directly transmits the print data to the printer, whereas, if said determination step determines to use the spool function of said image storage step, controlling said image storage step to store the print data;
    a receiving step of receiving transmission permission information from the server apparatus indicating the print data may be transmitted to the printer when the print data is stored in said image storage step; and
    a transmission step of transmitting the print data to the printer when said receiving means receives the transmission permission information from the server apparatus.--

Claim 22 should read:

--22. An information processing apparatus as a client including an image storage unit having a spool function, that communicates with a server apparatus, which manages a print order and has a spool unit for storing a print job and intermediate data of the print job, and a printer via a network, comprising:
    image storage means for storing the print job and the intermediate data of the print job to be executed according to a print request such that the information processing apparatus directly transmits the print job to the printer without intervention of the server apparatus if the spool function of the said client is selected by a user;

UNITED STATES PATENT AND TRADEMARK OFFICE
CERTIFICATE OF CORRECTION

| | | |
|---|---|---|
| PATENT NO. | : 6,985,243 B1 | |
| APPLICATION NO. | : 09/512358 | |
| DATED | : January 10, 2006 | |
| INVENTOR(S) | : Kazutaka Matsueda | |

It is certified that error appears in the above-identified patent and that said Letters Patent is hereby corrected as shown below:

Claim 22 (cont'd)
 list acquisition means for acquiring a list of print jobs managed by the server apparatus;
 job designation means for designating a print job to be previewed based on the list of print jobs acquired by said list acquisition means;
 determination means for determining whether the intermediate data of the print job designated by said job designation means is stored in said image storage means or in the spool unit of the server apparatus;
 intermediate data acquisition means for, if it is determined by said determination means that the intermediate data of the print job designated by said job designation means is stored in said image storage means, reading the intermediate data from said image storage means, whereas, if it is determined by said determination means that the intermediate data is stored in the server apparatus, downloading the intermediate data from the server apparatus; and;
 control means for displaying a preview image based on the intermediate data acquired by said intermediate data acquisition means.--

COLUMN 19:
Claim 26 should read:

--26. A print managing method for an information processing apparatus as a client including an image storage unit having a spool function, that communicates with a server apparatus, which manages a print order and has a spool unit for storing a print job and intermediate data of the print job, and a printer via a network, comprising:
 an image storage step of storing the print job and the intermediate data of the print job to be executed according to a print request such that the information processing apparatus directly transmits the print job to the printer without intervention of the server apparatus if the spool function of the said client is selected by a user;
 a list acquisition step of acquiring a list of print jobs managed by the server apparatus;
 a job designation step of designating a print job to be previewed based on the list of print jobs acquired by said list acquisition means;
 a determination step of determining whether the intermediate data of the print job designated by said job designation step is stored in said image storage step or in the spool unit of the server apparatus;

UNITED STATES PATENT AND TRADEMARK OFFICE
CERTIFICATE OF CORRECTION

PATENT NO. : 6,985,243 B1
APPLICATION NO. : 09/512358
DATED : January 10, 2006
INVENTOR(S) : Kazutaka Matsueda It is certified that error appears in the above-identified patent and that said Letters Patent is hereby corrected as shown below:

Claim 26 (cont'd)
an intermediate data acquisition step of, if it is determined by said determination step that the intermediate data of the print job designated by said job designation step is stored in said image storage step, reading the intermediate data from said image storage step, whereas, if it is determined by said determination step that the intermediate data is stored in the server apparatus, downloading the intermediate data from the server apparatus; and
a control step of displaying a preview image based on the intermediate data acquired by said intermediate data acquisition step.--

COLUMN 20:
Claim 30 should read:

--30. A computer readable storage medium storing a program for implementing a print managing method for an information processing apparatus as a client including an image storage unit having a spool function, that communicates with a server apparatus, which manages a print order and has a spool unit for storing a print job and intermediate data of the print job, and a printer via a network, comprising:
an image storage step of storing the print job and the intermediate data of the print job to be executed according to a print request such that the information processing apparatus directly transmits the print job to the printer without intervention of the server apparatus if the spool function of the said client is selected by a user;
a list acquisition step of acquiring a list of print jobs managed by the server apparatus; a job designation step of designating a print job to be previewed based on the list of print jobs acquired by said list acquisition step;
a determination step of determining whether the intermediate data of the print job designated by said job designation step is stored in said image storage step or in the spool unit of the server apparatus;
an intermediate data acquisition step of, if it is determined by said determination step that the intermediate data of the print job designated by said job designation step is stored in said image storage step, reading the intermediate data from said image storage step, whereas, if it is determined by said determination step that the intermediate data is stored in the server apparatus, downloading the intermediate data from the server apparatus; and
a control step of displaying a preview image based on the intermediate data acquired by said intermediate data acquisition step.--

UNITED STATES PATENT AND TRADEMARK OFFICE
CERTIFICATE OF CORRECTION

PATENT NO.       : 6,985,243 B1
APPLICATION NO.  : 09/512358
DATED            : January 10, 2006
INVENTOR(S)      : Kazutaka Matsueda It is certified that error appears in the above-identified patent and that said Letters Patent is hereby corrected as shown below:

COLUMN 22:
Line 9, "data" should read -- information --.

Signed and Sealed this

Seventeenth Day of April, 2007

JON W. DUDAS
*Director of the United States Patent and Trademark Office*